(12) United States Patent
Veto (10) Patent No.: US 10,837,775 B2
(45) Date of Patent: Nov. 17, 2020

(54) METHOD OF USING A HYBRID POWER SOURCE AND CONTROL MOMENT GYROSCOPE

(71) Applicant: THE BOEING COMPANY, Chicago, IL (US)

(72) Inventor: Christopher C. Veto, Huntington Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 11 days.

(21) Appl. No.: 16/253,550

(22) Filed: Jan. 22, 2019

(65) Prior Publication Data

US 2019/0170512 A1  Jun. 6, 2019

Related U.S. Application Data

(62) Division of application No. 15/013,947, filed on Feb. 2, 2016, now Pat. No. 10,228,248.

(51) Int. Cl.
| | |
|---|---|
| *G01C 19/10* | (2006.01) |
| *B64G 1/28* | (2006.01) |
| *B63B 39/04* | (2006.01) |
| *B64G 1/42* | (2006.01) |

(52) U.S. Cl.
CPC .............. *G01C 19/10* (2013.01); *B63B 39/04* (2013.01); *B64G 1/285* (2013.01); *B64G 1/286* (2013.01); *B64G 1/421* (2013.01); *B64G 1/425* (2013.01)

(58) Field of Classification Search
CPC .......... G01C 19/10; B63B 39/04; B63G 8/14; B64C 17/06; B64G 1/285; G05D 1/08
See application file for complete search history.

(56) References Cited

U.S. PATENT DOCUMENTS

| | | | | |
|---|---|---|---|---|
| 6,231,011 | B1* | 5/2001 | Chu | B64G 1/283 244/165 |
| 6,615,681 | B1 | 9/2003 | Jenkins et al. | |
| 6,973,847 | B2* | 12/2005 | Adams | B63B 39/04 |
| 7,383,747 | B2* | 6/2008 | Tippett | F03G 3/00 74/5.22 |
| 7,554,283 | B2* | 6/2009 | Yazdani Damavandi | F03G 3/08 318/625 |
| 8,052,093 | B2 | 11/2011 | Faucheux et al. | |

(Continued)

*Primary Examiner* — Zakaria Elahmadi
(74) *Attorney, Agent, or Firm* — Moore Intellectual Property Law, PLLC (57) ABSTRACT

A method, for providing spatial stability and electrical power with a hybrid power source and control moment gyroscope (HPCMG), includes producing spatial stability force for the HPCMG by spinning a central mass within a first transverse gimbal assembly about a first axis of rotation of a control moment gyroscope (CMG). The CMG includes the first transverse gimbal assembly, the central mass, and a second gimbal assembly rotationally connected to the first transverse gimbal assembly. The first transverse gimbal assembly is rotationally connected to the central mass at a first position of the first transverse gimbal assembly and at a second position of the first transverse gimbal assembly along the first axis of rotation. The method includes producing a voltage potential with the central mass. The method includes charging or discharging the central mass through conductive bearings.

20 Claims, 8 Drawing Sheets

(56) References Cited

U.S. PATENT DOCUMENTS

| | | | |
|---|---|---|---|
| 8,269,470 B2* | 9/2012 | Wu | H02K 7/025 |
| | | | 290/1 R |
| 8,443,683 B2* | 5/2013 | Rhee | G01C 19/30 |
| | | | 74/5.4 |
| 2002/0170368 A1* | 11/2002 | Adcock | F16H 33/10 |
| | | | 74/5.4 |
| 2004/0118231 A1* | 6/2004 | Peck | B64G 1/286 |
| | | | 74/5.4 |
| 2007/0272142 A1* | 11/2007 | Nedwed | B63B 39/04 |
| | | | 114/122 |
| 2008/0047375 A1* | 2/2008 | Sonoura | G05D 1/0891 |
| | | | 74/5.22 |
| 2009/0317233 A1* | 12/2009 | Carter | B81C 1/00198 |
| | | | 415/83 |
| 2013/0233100 A1* | 9/2013 | Kim | G01C 19/06 |
| | | | 74/5.95 |
| 2016/0137318 A1 | 5/2016 | Fitz-Coy et al. | |
| 2017/0067451 A1* | 3/2017 | Leberer | B64G 1/409 |

* cited by examiner

METHOD OF USING A HYBRID POWER SOURCE AND CONTROL MOMENT GYROSCOPE

CLAIM OF PRIORITY

The present application claims priority from, and is a divisional application of, U.S. patent application Ser. No. 15/013,947, filed Feb. 2, 2016, the contents of which is incorporated by reference herein in their entirety.

FIELD

The present invention relates to self-guided aerial vehicles, and more, particularly to control moment gyroscopes ("CMG").

RELATED ART

At present a number of vehicles (such as, for example aircraft, spacecraft, and surface and submersible marine vehicles) utilize control moment gyroscopes ("CMG") as attitude control devices within attitude control and inertial navigation systems of the vehicles. In general, a CMG is a device that includes a gyroscope that includes a spinning rotor and one or more motorized gimbals that tilt the angular momentum of the rotor. As is appreciated by those of ordinary skill in art, a gyroscope is a device that includes the spinning rotor where the axis of rotation of the spinning rotor is free to assume any orientation and the orientation of this axis of rotation is unaffected by tilting or rotation of the gimbal because of the conservation of angular momentum. Additionally, a gimbal is a pivoted support structure that allows the rotation of an object about at least a single axis.

While CMGs are very useful for both attitude control and inertial navigation systems of these types of vehicles, their disadvantage is weight that induces a weight penalty on the respective vehicle. Additionally, the necessary power supplies of these vehicles are also heavy components because they typically include electrical batteries that are heavy devices.

As a result, vehicles in the aerospace, submersible, space-access, and space-based arenas have a problem that the physical limitation on the amount of payload that a respective vehicle is capable of carrying is directly related to the combined weight of all the on-board components and devices on that vehicle. This problem increases as these vehicles become smaller, carry more payload, or both. As such, there is a need for a system and method that resolves these problems.

SUMMARY

Disclosed is a hybrid power source and control moment gyroscope ("HPCMG"). The HPCMG includes a control moment gyroscope ("CMG"), a first conductive bearing, and a second conductive bearing. The CMG includes a first transverse gimbal assembly, a central mass that produces a voltage potential, and a second gimbal assembly rotationally connected to the first transverse gimbal assembly. The first transverse gimbal assembly is rotationally connected to the central mass at a first position of the transverse gimbal assembly and a second position of the transverse gimbal assembly along a first axis of rotation and the central mass is configured to spin about the first axis of rotation and the first transverse gimbal assembly is configured to rotate about a second axis of rotation at a first position of the second gimbal assembly. The first conductive bearing rotationally connects the central mass with the first position of the first transverse gimbal assembly along the first axis of rotation and the second conductive bearing rotationally connects the central mass with the second position of the first transverse gimbal assembly along the first axis of rotation. The first and second conductive bearings are in signal communication with the central mass.

As an example of operation, the HPCMG performs a method that provides spatial stability and electrical power to a vehicle with the HPCMG. The method includes spinning a central mass within a first transverse gimbal assembly along a first axis of rotation of the CMG, producing spatial stability force for the HPCMG as a result of spinning the central mass, producing a voltage potential with the central mass, and discharging the central mass through two conductive bearings.

Other devices, apparatus, systems, methods, features and advantages of the invention will be or will become apparent to one with skill in the art upon examination of the following figures and detailed description. It is intended that all such additional apparatus, systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A hybrid power source and control moment gyroscope ("HPCMG") is disclosed. The HPCMG includes a control moment gyroscope ("CMG"), a first conductive bearing, and a second conductive bearing. The CMG includes a first transverse gimbal assembly, a central mass that produces a voltage potential, and a second gimbal assembly rotationally connected to the first transverse gimbal assembly. The first transverse gimbal assembly is rotationally connected to the central mass at a first position of the transverse gimbal assembly and a second position of the transverse gimbal assembly along a first axis of rotation and the central mass is configured to spin about the first axis of rotation and the first transverse gimbal assembly is configured to rotate about a second axis of rotation at a first position of the second gimbal assembly. The first conductive bearing rotationally connects the central mass with the first position of the first transverse gimbal assembly along the first axis of rotation and the second conductive bearing rotationally connects the central mass with the second position of the first transverse gimbal assembly along the first axis of rotation. The first and second conductive bearings are in signal communication with the central mass.

As an example of operation, the HPCMG performs a method that provides spatial stability and electrical power to a vehicle with the HPCMG. The method includes spinning a central mass within a first transverse gimbal assembly along a first axis of rotation of the CMG, producing spatial stability force for the HPCMG as a result of spinning the central mass, producing a voltage potential with the central mass, and discharging the central mass through two conductive bearings.

Figure 1:
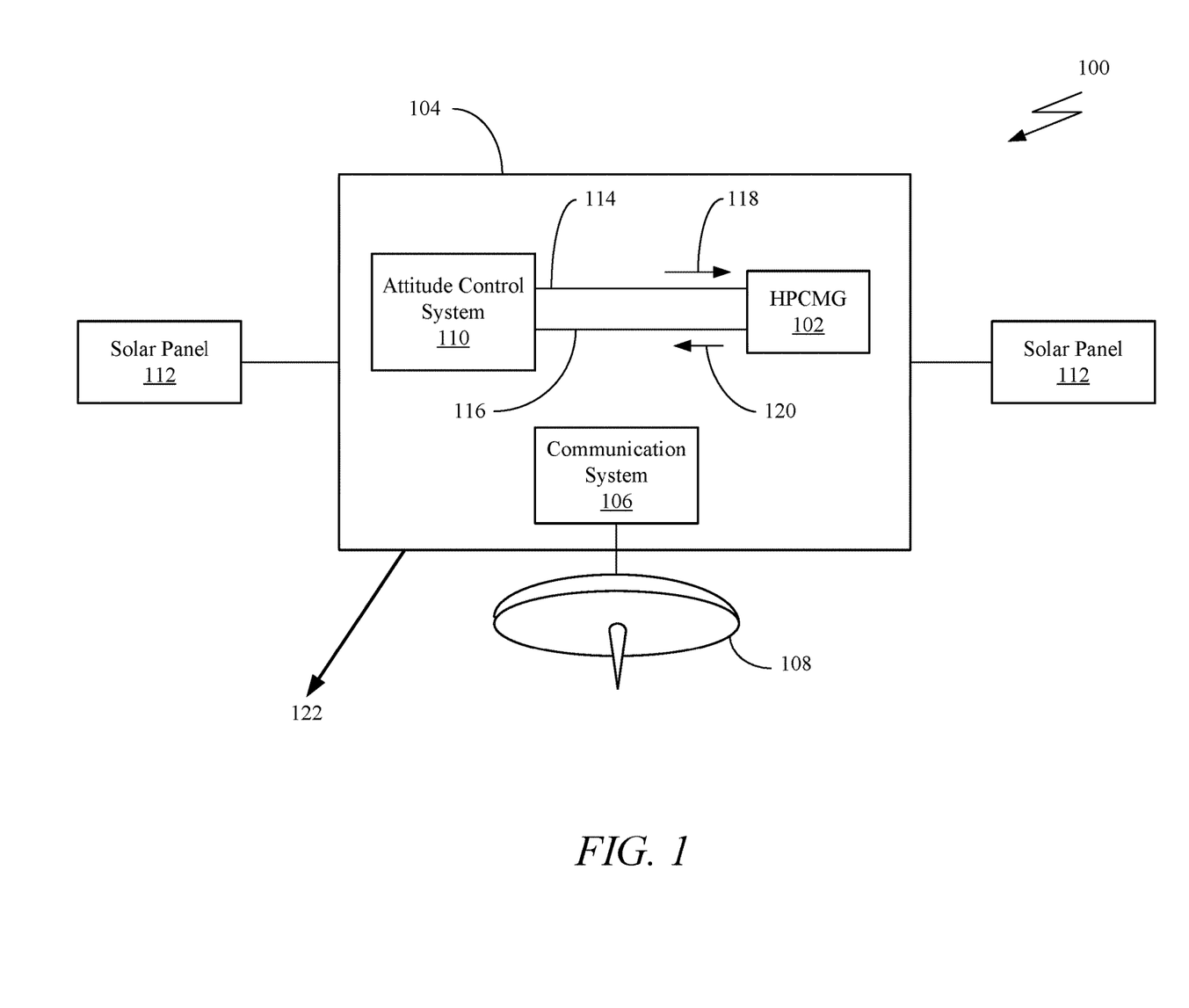
FIG. 1 is a system block diagram of an example of an implementation of a vehicle having a hybrid power source and control moment gyroscope ("HPCMG") in accordance with the present disclosure.

Turning to FIG. 1, a system block diagram of an example of an implementation of a vehicle 100 having a HPCMG 102 is shown in accordance with the present disclosure. In this example, the vehicle 100 is shown to be a spacecraft and specifically a communication satellite. The satellite 100 may include a satellite body (i.e., the housing of the vehicle) 104, a communication system 106 that communicates to Earth (or other satellites) via an antenna 108, an attitude control system 110, solar panels 112, and the HPCMG 102. The HPCMG 102 is in signal communication with the attitude control system 110 via signal path 114 and receives attitude information from the attitude control system 110. The HPCMG 102 may also be in signal communication with the attitude control system 110 via a second signal path 116. Furthermore, the HPCMG 102 may also receive an attitude signal 118 from the attitude control system 110, via signal path 114, and provide a voltage signal 120, via signal path 116, to the attitude control system 110, communication system 106 or other satellite 110 components (not shown) within the satellite 100.

In this example, the HPCMG 102 includes a CMG (not shown) that receives the attitude control signal 118 from the attitude control system 110 via signal path 114. In an example of operation, the CMG includes a spinning rotor (i.e., the central mass) (not shown) and one or more motorized gimbals (i.e., the first transverse gimbal assembly and second gimbal assembly) (not shown) that tilt the angular momentum of the rotor. As the rotor tilts, the changing angular momentum causes a gyroscopic torque that produces a directed force 122 on the satellite body 104 that moves the satellite 100 in the direction of the directed force 122.

In addition to receiving the attitude control signal 118 at the HPCMG 102, the central mass (i.e., the rotor) also produces (or stores) a voltage potential signal (i.e., voltage signal 120) that is passed from (or received by) the spinning central mass through a pair of conductive bearings on the first transverse gimbal assembly (not shown) to or from other components, circuits, and/or devices within the satellite 100. In this example, the voltage signal 120 is shown being passed to the attitude control system 110 via signal path 116, however, it is appreciated by those of ordinary skill in the art that the voltage signal may also be passed to (or received from) the communication system 106 or other satellite 100 components, circuits, and/or devices. Additionally, it is also appreciated by those of ordinary skill in the art that while a satellite is shown as an example of the vehicle 100 in FIG. 1, the vehicle 100, alternatively, may be an aircraft, surface marine vehicle, or submersible marine vehicle.

The circuits, components, modules, and/or devices of, or associated with, the improved HPCMG 102 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 2A:
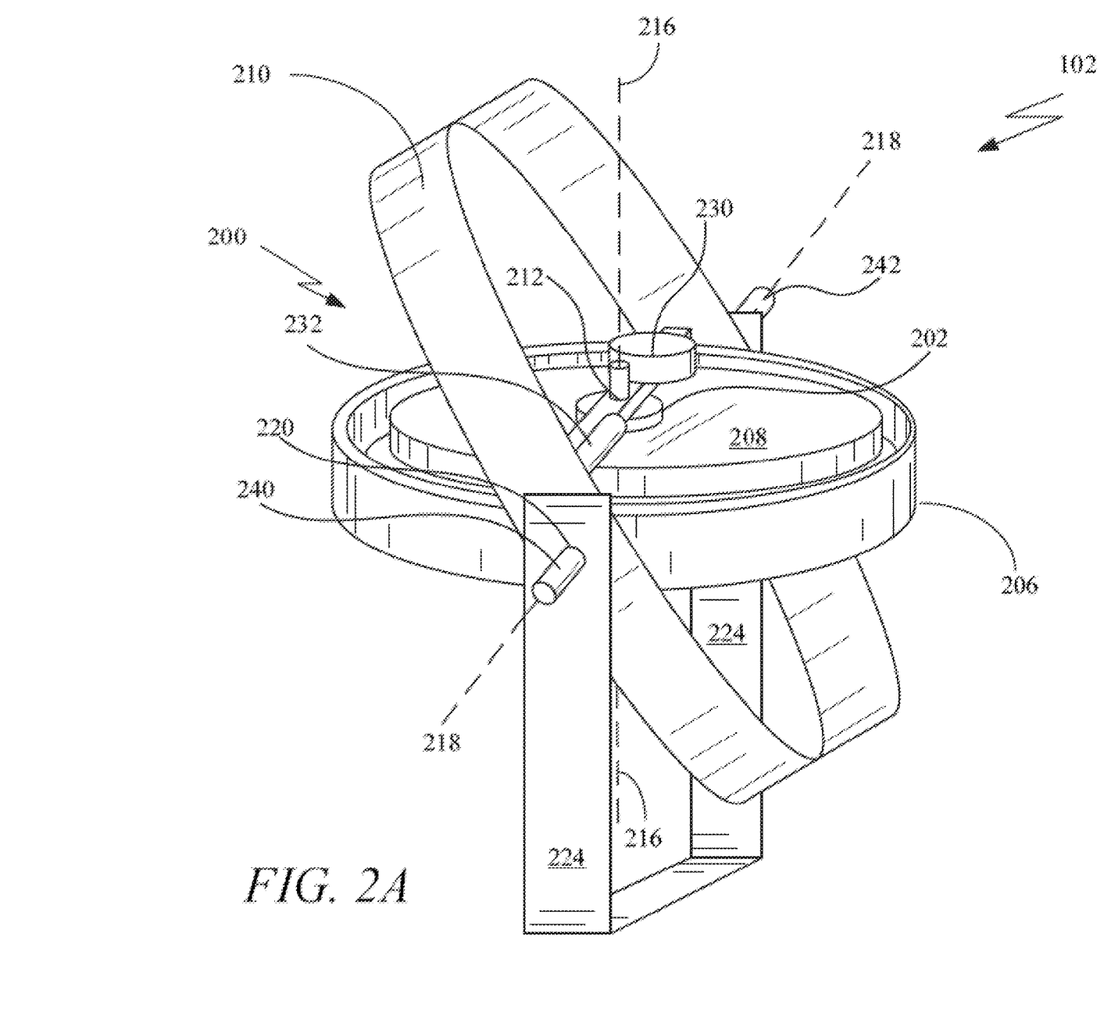
FIG. 2A is a side perspective view of an example of an implementation of the HPCMG 102 is shown in accordance with the present disclosure.
Figure 2B:
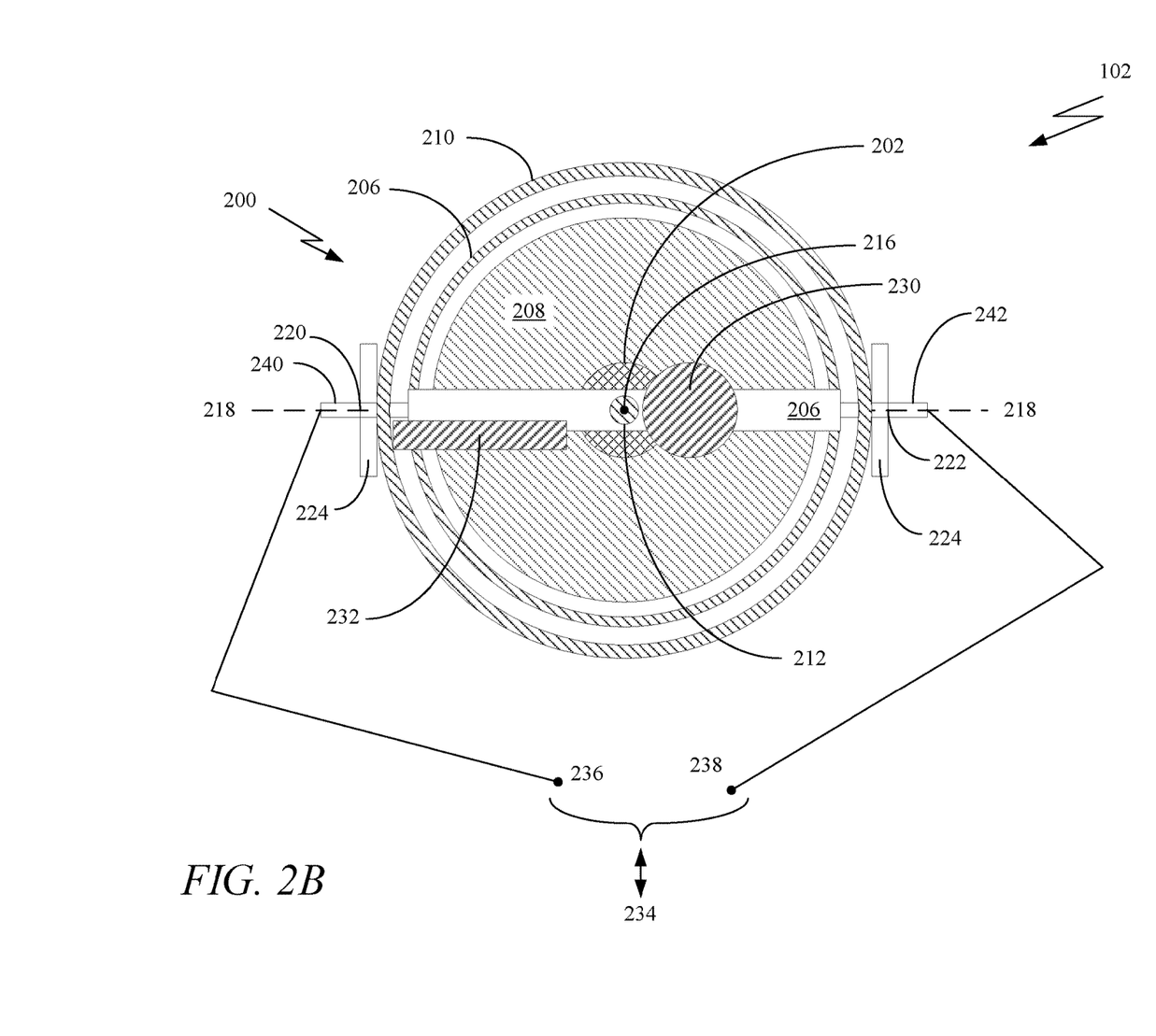
FIG. 2B is a top view of the HPCMG shown in FIG. 2A in accordance with the present disclosure.
Figure 2C:
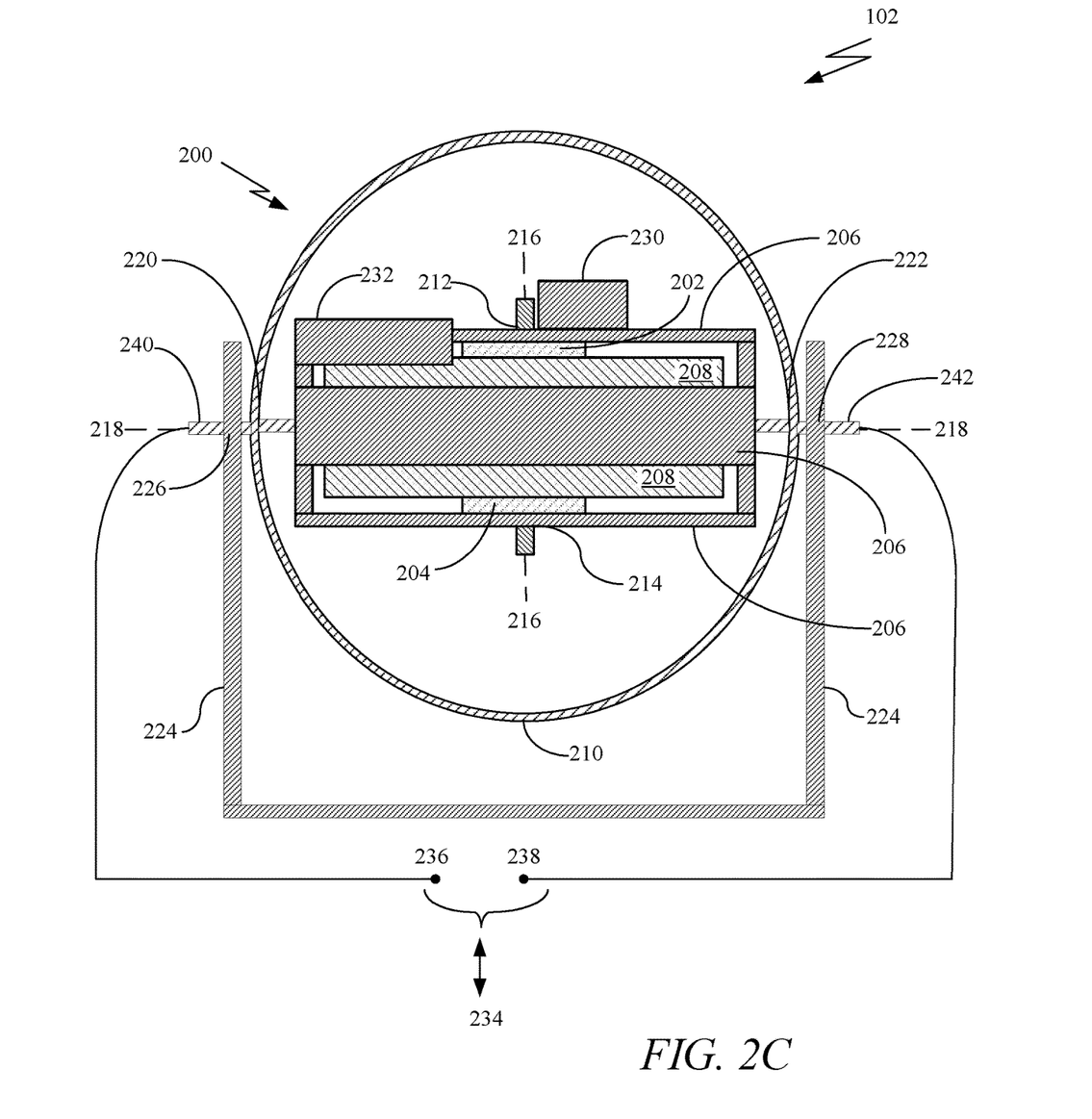
FIG. 2C is a front view of the HPCMG shown in FIGS. 2A and 2B in accordance with the present disclosure.

Turning to FIG. 2A, a side perspective view of an example of an implementation of the HPCMG 102 is shown in accordance with the present disclosure. Similarly, FIG. 2B shows a top view of HPCMG 102 shown in FIG. 2A. Moreover, FIG. 2C shows front view of the HPCMG 102 shown in FIGS. 2A and 2B. In this example, the HPCMG 102 includes a CMG 200, a first conductive bearing 202, and a second conductive bearing 204. The CMG 200 includes a first transverse gimbal assembly 206, a central mass 208 that produces a voltage potential, and a second gimbal assembly 210 rotationally connected to the first transverse gimbal assembly 206. The first transverse gimbal assembly 206 is rotationally connected to the central mass 208 at a first position 212 of the first transverse gimbal assembly 206 and a second position 214 of the first transverse gimbal assembly 206 along a first axis 216 of rotation and the central mass 208 is configured to spin about the first axis 216 of rotation and the first transverse gimbal assembly 206 is configured to rotate about a second axis 218 of rotation at a first position 220 and second position 222 of the second gimbal assembly 210. The first conductive bearing 202 rotationally connects the central mass 208 with the first position 212 of the first transverse gimbal assembly 206 along the first axis 216 of rotation and the second conductive bearing 204 rotationally connects the central mass 208 with the second position 212 of the first transverse gimbal assembly 206 along the first axis 216 of rotation. In this example, the first and second conductive bearings 202 and 204 are in signal communication with the central mass 208. The second gimbal assembly 210 may be connected to a third gimbal assembly 224 adjacent to the first position 220 and second position 222 of the second gimbal assembly 210 at a first position 226 and second position 228 of the third gimbal assembly 224 along the second axis 218 of rotation. The third gimbal assembly 224 may be physically connected to the vehicle body 104. In this example, the first transverse gimbal assembly 206, second gimbal assembly 210, and third gimbal assembly 224 may be constructed of any hard material such as a metal, carbon fiber, or hard plastic.

In this example, the CMG 200 may include a first motor 230 that is physically connected and rotationally coupled to the first transverse gimbal assembly 206 and is configured to rotate the central mass 208 and a second motor 232 that is also physically connected and rotationally coupled to the first transverse gimbal assembly 206 and is configured to provide a moment force to the first transverse gimbal assembly 206 as it angularly deflects (i.e., tilts) along the second axis 218 of rotation along the second gimbal assembly 210. The first motor 230 is a high-rate motor and it is configured to spin the central mass 208 at a high rate along the first axis 216 of rotation. Moreover, the second motor 232 is a torque motor and it is configured to control the rotation of the first transverse gimbal assembly 206 along the second axis 218 of rotation.

In an example of operation, the first and second motors 230 and 232 receive the attitude control signal 118 (shown in FIG. 1) and the first motor 230 spins the central mass 208 at a rotational speed that is controlled by the attitude control system 110. When the central mass 208 is spinning within the first transverse gimbal assembly 206, the central mass 208 acts as a reaction wheel (a type of flywheel) that acquires an initial amount of angular momentum as the central mass 208 spins at a constant speed. When the rotation speed of the central mass 208 is changed, the central mass 208 experiences a change of angular momentum which results in creating of a proportionately counter-rotational force being exerted on the first transverse gimbal assembly 206 as the result of the conservation of angular momentum from the third law of motion in physics. The resulting counter-rotational force is then exerted onto the second gimbal assembly 210 which causes the first transverse gimbal assembly 206 to counter-rotate along the first axis 216 of rotation. The second motor 232 acts as a torque motor in that it rotates (i.e., tilts) the first transverse gimbal assembly 206 within the second gimbal assembly 210 so as to direct the counter-rotational force (i.e., the direction of the resulting torque from the central mass 208) along the second axis 218 of rotation. The resulting titled counter-rotational force (which is a spatial stability force of the vehicle 100) is then exerted onto the third gimbal assembly 224 that may be physically connected to the vehicle body 104 resulting in a directed force 122 on the vehicle body 104 that is directly proportional to the attitude control signal 118 provided by the attitude control system 110. It is appreciated by those of ordinary skill in the art that the first and second motors 230 and 232 may be analog or digital motors such that the attitude control signal 118 may be a corresponding analog current and/or voltage signal or a digital encoded signal.

In addition to the first and second motors 230 and 232, the HPCMG 102 may also include a rate sensor (not shown) attached to the first transverse gimbal assembly 206 and an angular displacement sensor (not shown) attached to the second gimbal assembly 210. For the convenience of illustration the rate sensor and displacement sensor have not been shown in FIGS. 2A through 2C, however, it is appreciated by those of ordinary skill in the art that these types of devices may be part of the first and second motors 230 and 232 in that they may be part of encoders (not shown) within the first and second motors 230 and 232 that measure the number and rate of revolutions of the drive shafts of the first and second motors 230 and 232 in operation. In this example, the rate sensor is configured to determine a rotation speed of central mass 208 when it is spinning along the first axis 216 of rotation and the angular displacement sensor is configured to determine an angle of deflection of the first transverse gimbal assembly 206 relative to the second gimbal assembly 210 as the first transverse gimbal assembly 206 rotates along the second axis 218 of rotation.

In addition to providing a directed force 122 that is directly related to the attitude control signal 118, the HPCMG 102 is also configured to produce or store a voltage signal 234 with the central mass 208 that is passed to the vehicle 100. The voltage signal 234 includes a positive potential value 236 and a negative potential value 238 that are produced at a positive terminal 240 and negative terminal 242, respectively, of the HPCMG 102. The positive and negative terminals 240 and 242 are in signal communication with the first and second conductive bearings 202 and 204, respectively.

In this example, the central mass 208 may be a power source that includes a plurality of layers and all of the layers of the plurality of layers are in signal communication to each other such that every pair of adjacent layers within the plurality of layers are electrically connected in series. These plurality of layers may be battery layers (such as, for example, battery cells) if the central mass 208 is a battery or capacitive layers (i.e., capacitive disks) if the central mass 208 is a capacitive power supply such as, for example, a super capacitor. If the central mass 208 is a battery, the battery layers may be, for example, battery cell disks that are nickel-metal hydride battery cells ("NiMH"), lithium-ion ("Li-ion") battery cells, or nickel cadmium ("NiCd") battery cells.

Figure 3A:
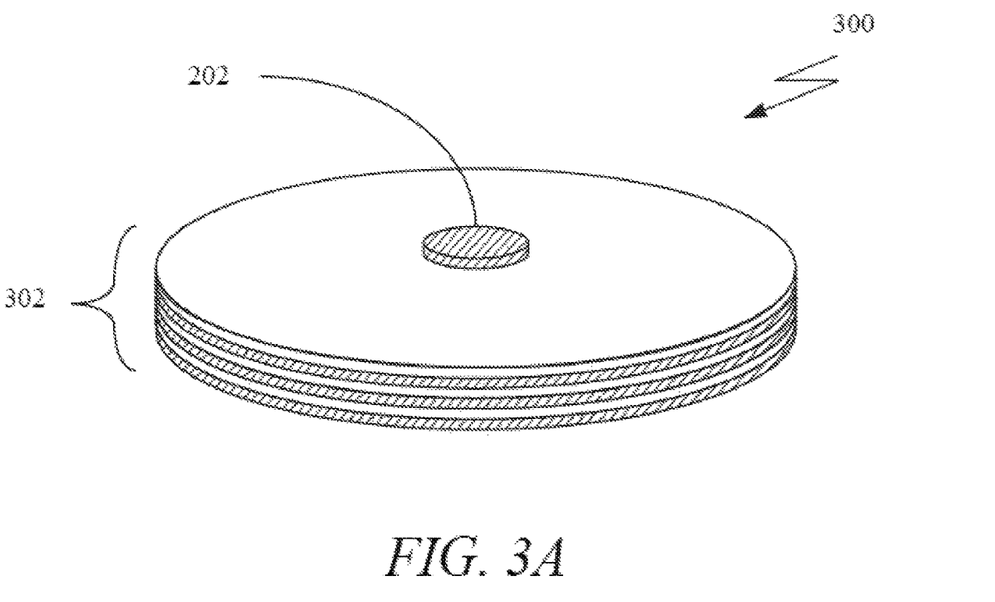
FIG. 3A is a perspective front view of an example of an implementation of the central mass of the HPCMG shown in FIG. 1 in accordance with the present disclosure.
Figure 3B:
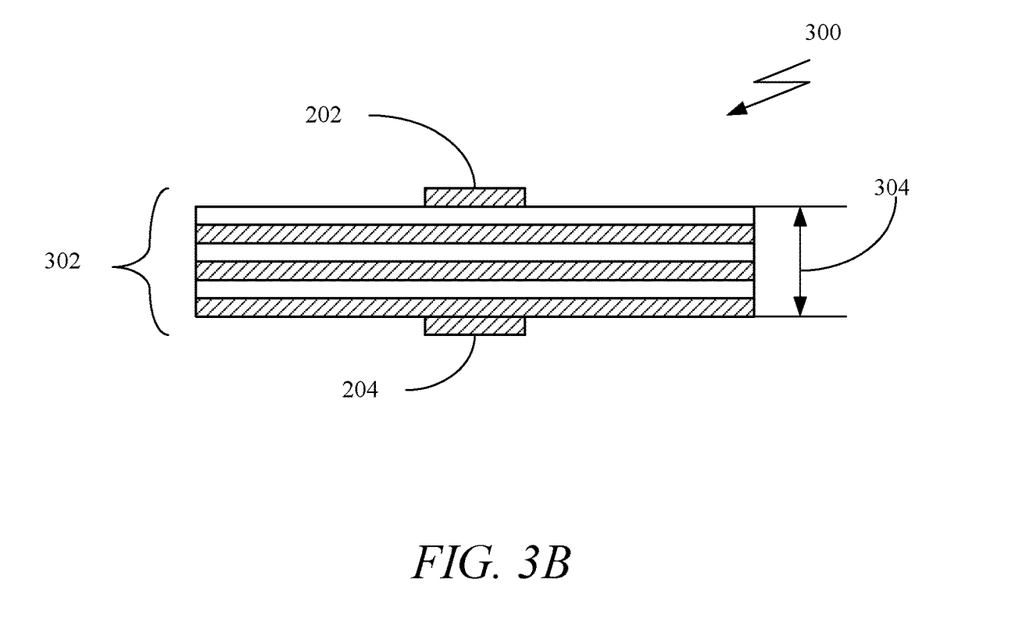
FIG. 3B is a front view of the central mass shown in FIG. 3A in accordance with the present disclosure.

Turning to FIGS. 3A and 3B, as an example of an implementation, the central mass 208 (shown in FIGS. 2A through 2C) may be implemented as a cylindrical central mass 300 having a plurality of layers 302 that may be either a plurality of battery cell disks or a plurality of capacitive disks. In either case, each layer of the plurality of layers 302 is configured as a constant-diameter disk such that when stacked up in series, the plurality of constant-diameter disk layers 302 form the cylindrical central mass 300 connected to the two conductive bearings 204 and 204. It is appreciated by those of ordinary skill in the art that the six layers shown in FIGS. 3A and 3B are for convenience of illustration and the actual number of layers may vary based on the designed thickness 304 and desired voltage capacity of the cylindrical central mass 300. As an example, the number of layers may be 350 but they may vary between approximately 6 to approximately 350 layers with the layer thickness varying, for example, between approximately 0.040 cm to approximately 2.0 cm per layer.

Figure 4:
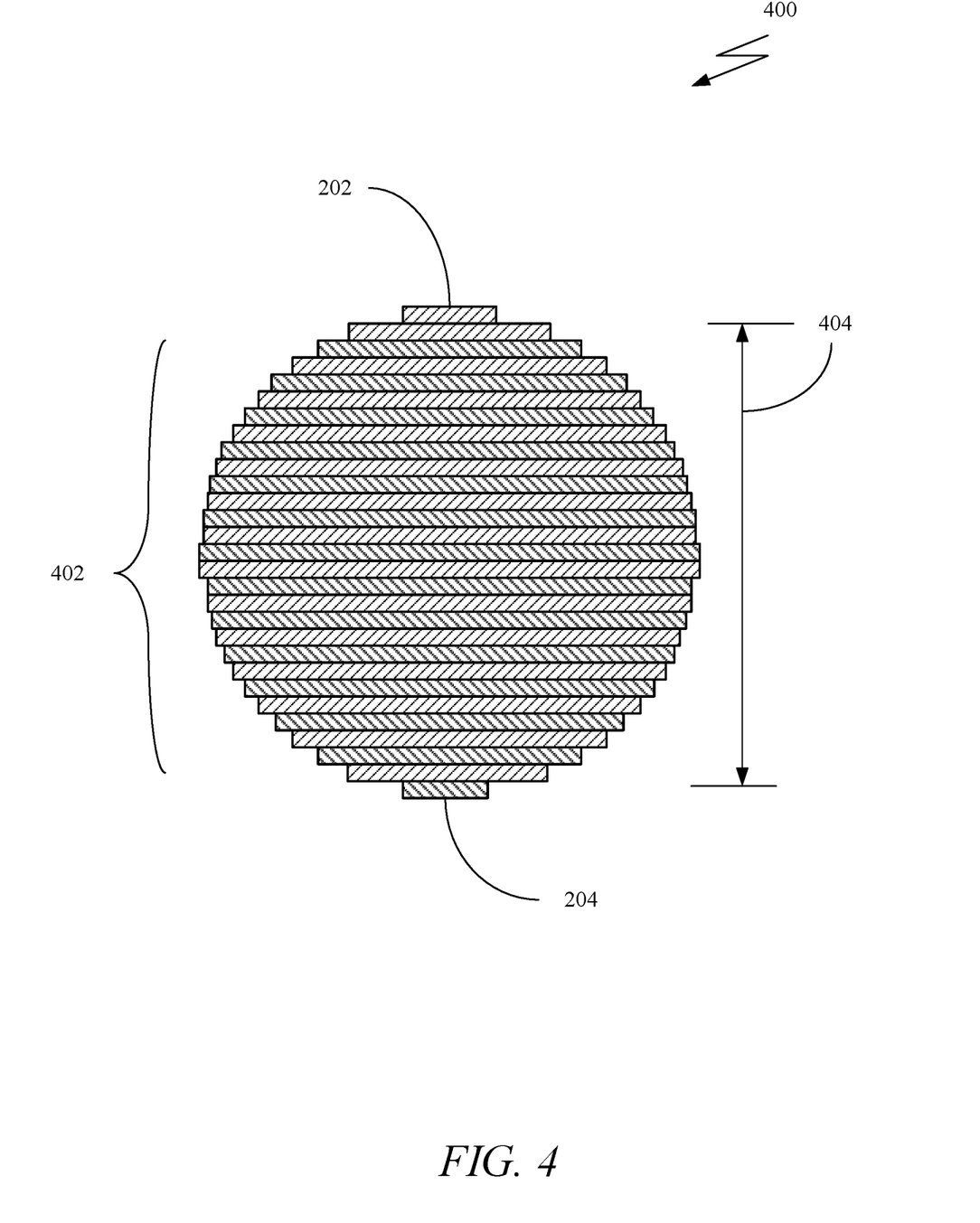
FIG. 4 is a front view of an example of another implementation of the central mass of the HPCMG shown in FIG. 1 in accordance with the present disclosure.

Alternatively, in FIG. 4, the central mass 208 (shown in FIGS. 2A through 2C) may be implemented as a spherical central mass 400 having a plurality of layers 402 that may be either a plurality of battery cell disks or a plurality of capacitive disks. In either case, each layer of the plurality of layers 402 is configured as a variable-diameter disk such that when stacked up in series, the plurality of variable-diameter disk layers 402 form the spherical central mass 400 connected to the two conductive bearings 202 and 204. It is appreciated by those of ordinary skill in the art that the 27 layers shown in FIGS. 3A and 3B are for convenience of illustration and the actual number of layers may vary based on the designed thickness 404 and desired voltage capacity of the spherical central mass 400. As an example, the number of layers may vary between 6 to 350 or more layers with the layer thickness varying, for example, between approximately 0.050 cm to approximately 2.0 cm per layer.

Figure 5:
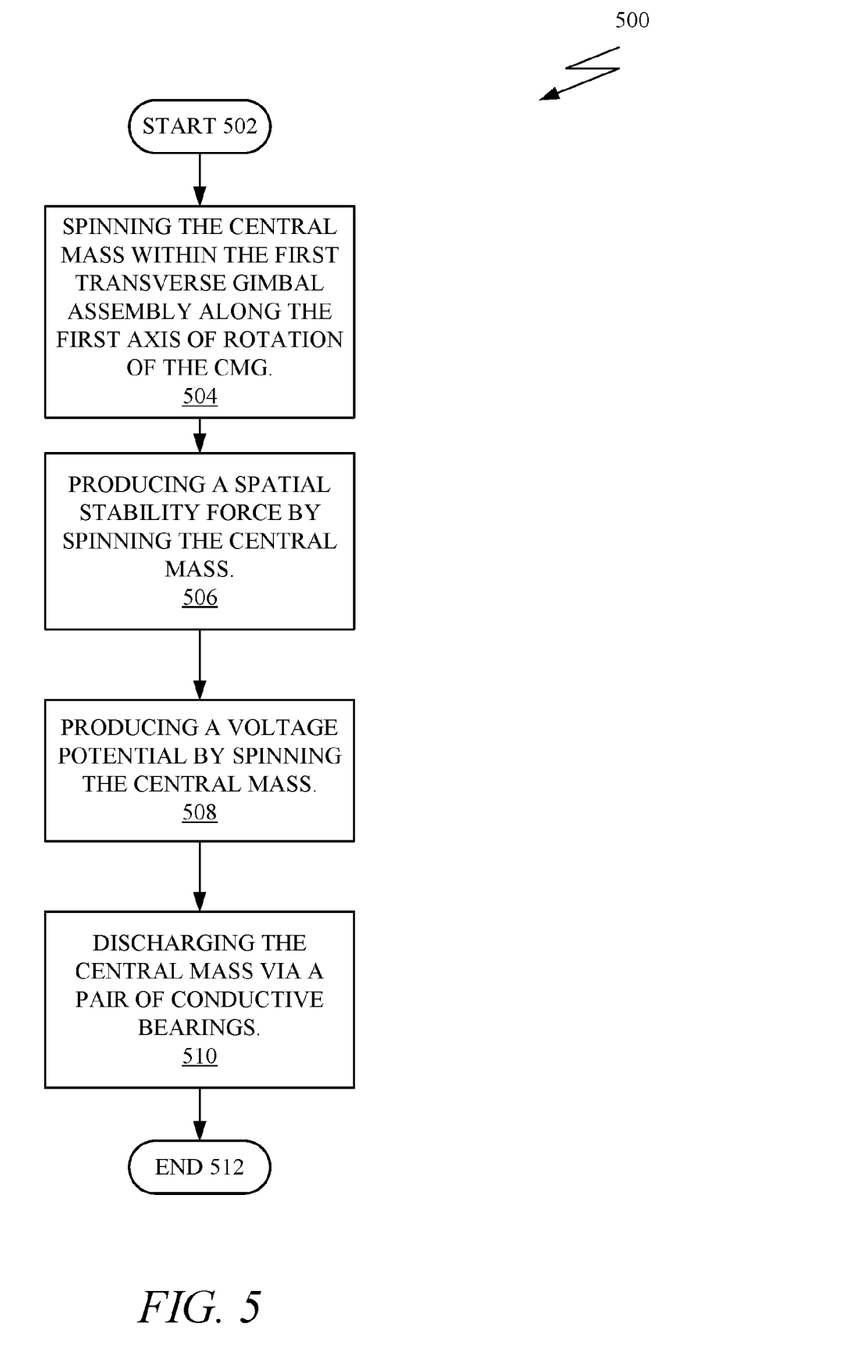
FIG. 5 is a flowchart of an example of an implementation of a method for providing spatial stability and electrical power to a vehicle with the HPCMG in accordance with the present disclosure.

As an example of operation, in FIG. 5 a flowchart 500 is shown of an example of an implementation of a method for providing spatial stability and electrical power to a vehicle 100 with the HPCMG 102. The process starts 502 by spinning, in step 504, the central mass 208, 300, and 400 within the first transverse gimbal assembly 206 along the first axis 216 of rotation of the CMG 200. The process then produces the spatial stability force 122, in step 506, for the HPCMG 102 and the voltage potential 120 and 234, in step 508, as a result of spinning the central mass 208, 300, and 400. Once the voltage potential 120 and 234 has been produced, the method then discharges, in step 510, the voltage potential 120 and 234 from the central mass via the two conductive bearings 202 and 204. The process then ends 512.

Figure 6:
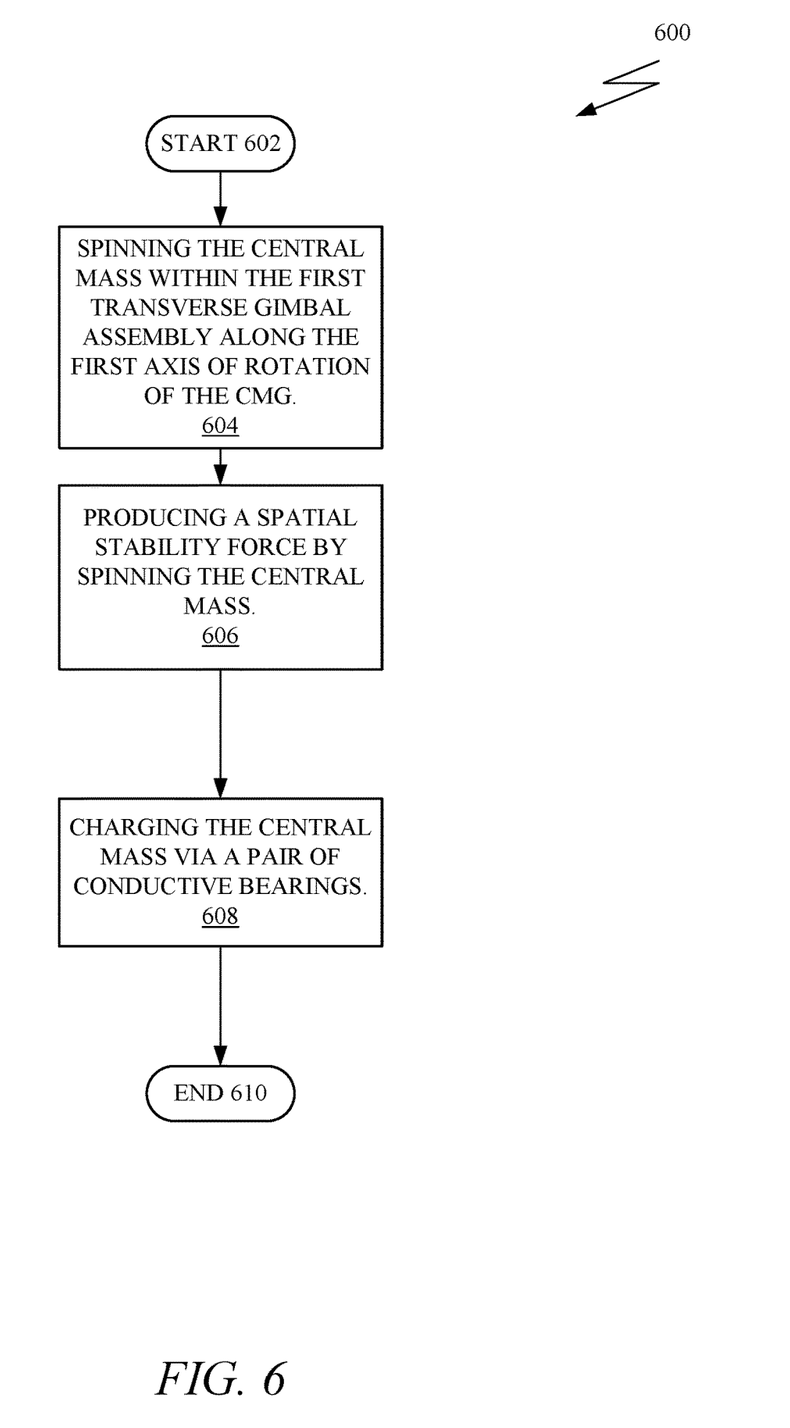
FIG. 6 is a flowchart of an example of an implementation of another method performed by the HPCMG, where the HPCMG is charged instead of discharged as shown in the example of FIG. 5.

Additionally, in FIG. 6 a flowchart 600 is shown of an example of an implementation of another method performed by the HPCMG 102. In this example, the central mass 208, 300, and 400 is charged instead of discharged as shown in the example of FIG. 5. The process starts 602 by spinning, in step 604, the central mass 208, 300, and 400 within the first transverse gimbal assembly 206 along the first axis 216 of rotation of the CMG 200. The process then produces the spatial stability force 122, in step 606, for the HPCMG 102. The process, in step 608, then charges the spinning central mass 208, 300, and 400 via the pair of conductive bearings 202 and 204. The process then ends 610.

It will be understood that various aspects or details of the implementations may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method for providing spatial stability and electrical power with a hybrid power source and control moment gyroscope (HPCMG) (102), the method comprising:
    producing spatial stability force (122) for the HPCMG by spinning a central mass (208, 300, 400) within a first transverse gimbal assembly (206) about a first axis (216) of rotation of a control moment gyroscope (CMG) (200), wherein the CMG (200) includes the first transverse gimbal assembly, the central mass, and a second gimbal assembly (210) rotationally connected to the first transverse gimbal assembly, wherein the first transverse gimbal assembly is rotationally connected to the central mass at a first position (212) of the first transverse gimbal assembly and at a second position (214) of the first transverse gimbal assembly along the first axis of rotation (216), wherein the central mass (208, 300, 400) comprises a plurality of layers (302 and 402), wherein all of the layers of the plurality of layers (302 and 402) are electrically interconnected to produce the voltage potential, and wherein the first transverse gimbal assembly is configured to rotate about a second axis of rotation (218) at a first position (220) of the second gimbal assembly;
    producing a voltage potential (120, 234) with the central mass; and
    discharging the central mass through conductive bearings (202, 204), wherein the conductive bearings are in signal communication with the central mass and rotationally connected to both the central mass and the first transverse gimbal assembly.

2. The method of claim 1, wherein producing the spatial stability force (122) includes generating a first moment of force along the first axis (216) of rotation and a second moment of force along the second axis (218) of rotation.

3. The method of claim 1, further comprising receiving an attitude control signal (118), wherein the central mass (208, 300, 400) is spun based on the attitude control signal.

4. The method of claim 3, wherein the plurality of layers (302 and 402) includes a capacitive disk or a disk having a battery cell.

5. The method of claim 1, wherein the HPCMG is coupled to a vehicle.

6. The method of claim 5, wherein the HPCMG is configured to provide power to the vehicle via the conductive bearings (202, 204).

7. The method of claim 5, wherein the HPCMG is configured to apply the spatial stability force on the vehicle via a third gimbal assembly (224) coupled to the second gimbal assembly (210).

8. The method of claim 5, wherein the vehicle is a submersible marine vehicle, a surface marine vehicle, an aircraft, or a spacecraft.

9. A method for providing spatial stability and electrical power with a hybrid power source and control moment gyroscope (HPCMG) (102), the method comprising:
    producing spatial stability force (122) for the HPCMG by spinning a central mass (208, 300, 400) within a first transverse gimbal assembly (206) about a first axis (216) of rotation of a control moment gyroscope (CMG) (200), wherein the CMG (200) includes the first transverse gimbal assembly, the central mass, and a second gimbal assembly (210) rotationally connected to the first transverse gimbal assembly, wherein the first transverse gimbal assembly is rotationally connected to the central mass at a first position (212) of the first transverse gimbal assembly and at a second position (214) of the first transverse gimbal assembly along the first axis of rotation (216), and wherein the first transverse gimbal assembly is configured to rotate about a second axis of rotation (218) at a first position (220) of the second gimbal assembly;
    charging the central mass (208, 300, and 400) with a first voltage potential (120 and 234) through conductive bearings (202 and 204), wherein the conductive bearings (202 and 204) are in signal communication with the central mass (208, 300, and 400) and rotationally connected to both the central mass (208, 300, and 400) and the first transverse gimbal assembly (206);
    after charging the central mass, producing a second voltage potential (120 and 234) with the central mass (208, 300, and 400); and
    discharging the central mass (208, 300, and 400) through the conductive bearings (202 and 204).

10. The method of claim 9, wherein the HPCMG is coupled to a vehicle.

11. The method of claim 9, wherein producing the spatial stability force (122) includes generating a first moment of force along the first axis (216) of rotation and a second moment of force along the second axis (218) of rotation.

12. The method of claim 9, wherein the central mass (208, 300, and 400) includes a plurality of layers (302 and 402), and wherein all of the layers of the plurality of layers (302 and 402) are electrically interconnected to produce the voltage potential.

13. The method of claim 12, wherein the plurality of layers (302 and 402) includes a capacitive disk or a disk having a battery cell.

14. The method of claim 9, further comprising receiving an attitude control signal (118), wherein the central mass (208, 300, 400) is spun based on the attitude control signal.

15. The method of claim 9, wherein the central mass (208, 300, 400) comprises a plurality of layers (302 and 402).

16. The method of claim 15, wherein layers of the plurality of layers (302 and 402) are electrically coupled in series.

17. A method for providing spatial stability and electrical power with a hybrid power source and control moment gyroscope (HPCMG) (102), the method comprising:
    producing spatial stability force (122) for the HPCMG by spinning a central mass (208, 300, 400) within a first transverse gimbal assembly (206) about a first axis (216) of rotation of a control moment gyroscope (CMG) (200), wherein the CMG (200) includes the first transverse gimbal assembly, the central mass, and a second gimbal assembly (210) rotationally connected to the first transverse gimbal assembly, wherein the first transverse gimbal assembly is rotationally connected to the central mass at a first position (212) of the first transverse gimbal assembly and at a second position (214) of the first transverse gimbal assembly along the first axis of rotation (216), and wherein the first transverse gimbal assembly is configured to rotate about a second axis of rotation (218) at a first position (220) of the second gimbal assembly;
    providing an electrical signal to or from the central mass via conductive bearings (202, 204), wherein the conductive bearings are in signal communication with the central mass and rotationally connected to both the central mass and the first transverse gimbal assembly; and
    receiving an attitude control signal (118), wherein the central mass (208, 300, 400) is spun based on the attitude control signal.

18. The method of claim 17, wherein producing the spatial stability force (122) includes generating a first moment of force along the first axis (216) of rotation and a second moment of force along the second axis (218) of rotation.

19. The method of claim 17, further comprising charging a capacitor or battery of the central mass responsive to the electrical signal.

20. The method of claim 17, further comprising discharging a capacitor or battery of the central mass responsive to the electrical signal.

* * * * *